United States Patent [19]

Hellwig et al.

[11] Patent Number: 4,803,596
[45] Date of Patent: Feb. 7, 1989

[54] SOLID-STATE CAPACITOR WITH AN ELECTROCONDUCTIVE POLYMER AS CONSTITUENT OF THE SOLID ELECTROLYTE

[75] Inventors: Gerhard Hellwig, Stegen; Ottmar Baur, Freiburg; Klaus Feisst, Kirchzarten; Helmut Moehwald, Heidelberg; Helmut Muenstedt, Wachenheim, all of Fed. Rep. of Germany

[73] Assignee: BASF Aktiengesellschaft, Ludwigshafen, Fed. Rep. of Germany

[21] Appl. No.: 111,604

[22] Filed: Oct. 23, 1987

[30] Foreign Application Priority Data

Oct. 23, 1986 [DE] Fed. Rep. of Germany ....... 3636100

[51] Int. Cl.$^4$ .......................... H01G 9/00; B01J 17/00
[52] U.S. Cl. .................................... 361/525; 29/570.1
[58] Field of Search .................. 361/433, 323; 427/80; 29/570.1

[56] References Cited

U.S. PATENT DOCUMENTS

| | | | |
|---|---|---|---|
| 3,214,648 | 10/1965 | Ross et al. ............................ | 361/433 |
| 3,340,444 | 9/1967 | Selke .................................... | 29/570.1 |
| 3,483,438 | 12/1969 | Sharbaugh ........................ | 29/570.1 |
| 3,516,150 | 6/1970 | Leech .................................. | 29/570.1 |
| 3,586,923 | 6/1971 | Yoshimura et al. ................ | 361/433 |
| 3,675,087 | 7/1972 | Zykox et al. ....................... | 29/570.1 |
| 4,009,424 | 2/1977 | Itoh ..................................... | 29/570.1 |
| 4,609,971 | 9/1986 | Shaffer ................................ | 361/433 |

FOREIGN PATENT DOCUMENTS 3419552 11/1985 Fed. Rep. of Germany ..... 29/570.1

Primary Examiner—Donald A. Griffin
Attorney, Agent, or Firm—Keil & Weinkauf

[57] ABSTRACT

In a solid-state capacitor comprising a positive and a negative electrode, a dielectric medium and a solid electrolyte, the solid electrolyte contains an electroconductive polymer as essential constituent.

8 Claims, 1 Drawing Sheet

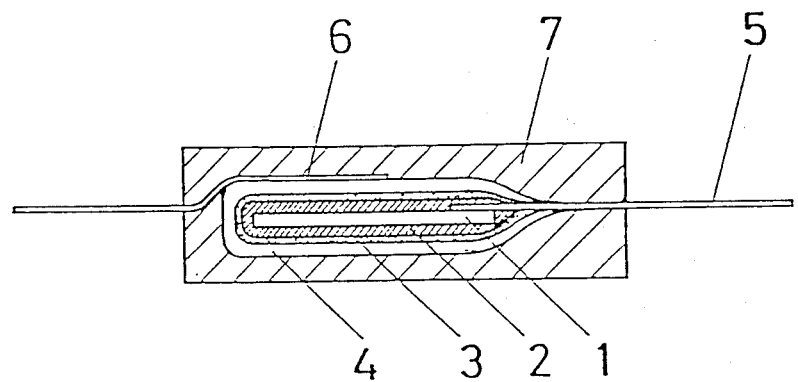

SOLID-STATE CAPACITOR WITH AN ELECTROCONDUCTIVE POLYMER AS CONSTITUENT OF THE SOLID ELECTROLYTE

The present invention relates to a solid-state capacitor comprising a positive and a negative electrode, a dielectric medium and a solid electrolyte, and to a process for preparing the solid electrolyte in such a solid-state capacitor.

Electrolyte capacitors containing wet electrolytes have a number of disadvantages, for example temperature dependence of the electrical properties, unfavorable frequency response of the apparent resistance, unsatisfactory residual current behavior and in particular proneness to permeation which shortens the life of the capacitor. In addition, in the event of an overload on a wet-electrolyte capacitor the solvent can evaporate unchecked, which can lead to explosive destruction of the capacitor. To avoid these disadvantages, it has been attempted to replace the wet electrolyte by a solid electrolyte. For instance, manganese dioxide has been used as solid electrolyte. Manganese dioxide, however, has adverse effects on the metal oxide layers frequently used as dielectric medium, so that a very expensive reoxidation becomes necessary.

Solid-state capacitors where, in place of manganese dioxide, salts of 7,7,8,8-tetracyanoquinodimethane (TCNQ) are used as solid electrolyte have a number of advantages over capacitors based on wet electrolytes. However, their manufacture presents problems. Customarily, the TCNQ salt is applied as a melt to the oxidized metal surface which serves as the dielectric medium. Since TCNQ salts have a relatively high melting point and in the molten state decompose within a few seconds, thereby losing their conductivity, a corresponding manufacturing process is relatively difficult and technically complicated. Furthermore, TCNQ salts are costly and toxic.

U.S. Pat. No. 4,609,671 describes capacitors where the solid electrolyte is a polyacrylonitrile which contains $LiClO_4$. It is true that such systems are referred to as electroconductive polymers, but this is actually a misnomer since the polymer itself does not contribute anything to the electroconductivity in such systems.

The capacitors described in U.S. Pat. No. 4,609,671 have the disadvantage that the polymer used therein is difficult and/or expensive to convert into the required finely divided form suitable for use as solid electrolyte.

It is an object of the present invention to provide a solid-state capacitor which is of the type mentioned at the beginning and which not only has good electrical data and a sufficiently long life but also is manufacturable in a simple and inexpensive manner.

We have found that this object is achieved with a solid-state capacitor comprising a positive and a negative electrode, a dielectric medium and a solid electrolyte which contains an intrinsically conductive polymer as essential constituent.

Preferred embodiments of the capacitor according to the invention are disclosed in the subclaims.

The drawing shows an embodiment of a capacitor according to the invention in section. An oxidized aluminum platelet 1 is surrounded by a polypyrrole layer 2. On this layer 2 there is a graphite coating 3 and, on top of that, a conductive silver coating 4. The positive and negative contact strips 5 and 6 respectively provide the contact toward the outside. The element is surrounded by an epoxy resin housing 7.

The electroconductive polymer which is used in the capacitor according to the invention is an intrinsically conductive polymer, ie. a polymer whose conductivity is based on electron migration in the polymer and not on the electroconductivity of salts. In the conductive (doped) state these polymers contain embedded counterions of only one kind of charge, to obtain charge neutrality, but no embedded salts.

These intrinsically conductive polymers should be distinguished from systems whose conductivity is based on the conductivity due to the ions of a salt and which have been applied to or incorporated in a nonelectroconductive polymer which serves as a quasi matrix. In these systems, the polymer itself does not contribute anything to the electroconductivity; if, as with the intrinsically conductive systems, only counterions of one kind of charge were introduced into such polymers (which is impossible in practise), this would produce no conductivity at all. Such polymer/salt systems should in truth not be referred to as electroconductive polymers.

For that reason, the intrinsically conductive polymers used according to the invention will hereinafter simply be referred to as electroconductive polymers.

Suitable electroconductive polymers are in principle p- and also n-conducting polymers. The electroconductivities of the polymers are in general within the range from $10^{-3}$ to $10^4$ S/cm, preferably from $10^{-3}$ to $5 \times 10^3$ S/cm, particularly preferably from $10^{-2}$ to $10^3$ S/cm.

Preferred (intrinsically) electroconductive polymers are doped (complexed, intercalated) pyrrole, aniline, furan or thiophene polymers, but in principle it is also possible to use other conventional electroconductive polymers, such as polyacetylenes and poly-p-phenylenes. p-Doped polymers of pyrrole and of aniline have proved particularly advantageous.

Polymers of pyrrole include for example, in general, homopolymers and copolymers of pyrrole and of substituted pyrroles and also copolymers of these monomers with other comonomers. Examples of monomers are pyrrole itself and pyrroles substituted on the carbon atoms by halogen, $C_1$-$C_8$-alkyl or alkoxy, and of comonomers are cyclopentadiene, acetylene, imidazole, thiazole, furan, thiophene and pyrazine, as described for example in EP-A-No. 36,118.

These pyrrole polymers preferably contain from 50 to 99% by weight of pyrrole and from 1 to 50% by weight of substituted pyrroles and/or other comonomers.

The second group of particularly preferred polymers comprises polymers of aniline, i.e. homopolymers of aniline or of substituted aniline derivatives of copolymers of these monomers with other monomers. Polymers of this type, and their properties, are known per se and are described for example in E. M. Genies et al., Mol. Cryst. Liq. Cryst. 121 (1985), 181-6 and A. G. McDiarmid et al., loc. cit. 121 (1985), 173-80.

In a preferred embodiment, the capacitor according to the invention contains a metallic positive electrode and, situated thereon, an oxide layer as dielectric medium.

Thus, the capacitor according to the invention can for example be configured as a wound capacitor having a metal foil, in particular an aluminum foil, as positive electrode and, situated thereon, an oxide layer as dielectric medium. Between this metal foil provided with a dielectric oxide layer and a further metal foil, which serves as the negative electrode, there are arranged one or more separating sheets comprising a coat of conductive polymer on, preferably, carbonized paper.

Furthermore, the capacitors according to the invention are also producible in the form of chip capacitors.

To produce a chip capacitor, a metal platelet, preferably of aluminum, or a metallic sinter, preferably a tantalum sinter, is provided with an oxide layer for use as dielectric medium. This dielectric oxide layer on the metal platelet or metallic sinter is coated with a layer of electroconductive polymer. The thickness of this layer is in general within the range from $10^{-2}$ to 200 $\mu$m, preferably from 0.1 to 150 $\mu$m, in particular from 1 to 100 $\mu$m. In some cases, layer thicknesses of from 10 to 100, in particular from 20 to 100, $\mu$m have proved advantageous.

Regardless of the specific structure of the capacitor, we have found in general that it is of advantage to provide the capacitor elements with a sealing sheath. The chief purpose of this sheath is to prevent the ingress of atmospheric humidity and oxygen, which each can have adverse effects on the electroconductive polymer and the capacitor as such.

The novel process for producing a solid-state capacitor as claimed in claims 1-11 or components thereof comprises coating the electrode materials, the dielectric medium and/or a separating sheet with monomers capable of forming an electroconductive polymer and with an oxidant, and thereby polymerizing the monomers.

If the polymerization is carried out from the liquid phase, it is advantageous to evaporate the solvent after the polymerization.

In a preferred embodiment of the process, which can be used for preparing the solid electrolyte in a capacitor as claimed in claim 5 or 6, the electroconductive polymer is prepared in the presence of a sheet of carbonizable or carbonized paper, for example by exposing a conventional, dry capacitor coil having a paper thickness of preferably from 30 to 50 $\mu$m to a temperature of 300° C. for a period of from 20 to 30 hours, during which the carbonizable paper forming the separating sheet becomes carbonized. This has two effects: first, the electrical resistance of the capacitor paper is lowered, and secondly the introduction of a polymer layer between the two metal foils is made easier.

Thereafter the monomer, which is in solution in a suitable solvent, can be applied, for example by dipping the coil element into the solution. The oxidant can be applied in a similar manner, although it is also sufficient to apply to the end surface of the coil a solution of a suitable oxidant, which subsequently diffuses into the coil.

After polymerization and, if necessary, drying, ie. removal of the solvent, the capacitor element can be equipped with a sealing sheath. To this end, it is introduced, for example into an aluminum cup and coated with epoxy resin.

In a modification of the process described above, it is also impossible, in principle, to apply the electroconductive polymer before the paper is carbonized and only then to carbonize the paper with the electroconductive polymer in place.

In a further embodiment of the process according to the invention, the electroconductive polymer which forms the essential constituent of the solid electrolyte is applied to the dielectric oxide layer of a capacitor according to the invention.

This can be done in general by contacting the oxidized surface with the monomer and a suitable oxidant. In this case too it is advantageous, if the polymerization is carried out in the liquid phase, to evaporate the solvent after the polymerization has taken place, for example by drying under reduced pressure.

Depending on the desired thickness of conductive polymer on the oxide layer, the coating process can be repeated as often as necessary. Subsequently, the layer of electroconductive polymer can be coated with graphite and/or conductive silver as cathodic connection.

In this case too it is of advantage, after the electroconductive polymer has been applied, to seal the capacitor element to substantially prevent effects due to atmospheric humidity and oxygen. For this purpose it is possible to use for example housings made of substantially gas-impermeable plastics.

Advantageous oxidants for preparing the electroconductive polymer are oxygen-containing oxidants which are generally used in amounts of from 0.1 to 2 moles per mole of compound to be polymerized. Larger amounts of oxidant are not necessary, nor advantageous, since on the one hand the aforementioned amount is generally sufficient to convert all the monomer into polymer and, on the other, an overlarge excess of oxidant can lead to nonuniform polymerization.

Proven oxidants are in particular peroxo acids and salts thereof, such as peroxodisulfuric acid and alkali metal and ammonium salts thereof. Preference is also given to using peroxoborates, perchlorates or peroxochromates, such as sodium perborate, potassium dichromate or iron perchlorate and copper perchlorate. Also suitable are permanganates, such as potassium permanganate, provided small amounts of acid are added thereto. The oxidant used can even be hydrogen peroxide, in which case, in general, the presence of conducting salts is highly advantageous. Further suitable oxidants are strong Lewis acids such as $FeCl_3$, $AsF_5$ and $SbF_5$.

If the oxidant used is of the type where the reduced form can at the same time act as the counterion in the electroconductive polymer, the presence of conducting salts (frequently also referred to as complexing agents or dopants) can be dispensed with. However, it is also possible to use other oxidants and to carry out the polymerization in the presence of such conducting salts. Specific examples of conducting salts are $KHSO_4$, $Na_2SO_4$, $HCOOH$, $LiClO_4$, $HClO_4$, $NEt_4ClO_4$, $NBu_4ClO_4$, $KAlF_3$, $NaAlF_6$, $KBF_4$, $K_2ZrF_6$, $NOPF_6$, $KAsF_6$ and $NaPF_6$. The concentration of conducting salt is advantageously dimensioned to be such that for every 3 moles of starting monomer there is present not less than 1 mole of conducting salt.

In the processes described above, the preparation of the electroconductive polymer is carried out from the liquid phase. Proven solvents of the liquid phase process are water and mixtures of water with organic water-miscible solvents. On the other hand, it is also possible to use organic solvents such as dimethyl sulfoxide, methanol, acetonitrile, ethylene carbonate, propylene carbonate, dioxane, dimethoxyethane, dimethyl sulfite or tetrahydrofuran or mixtures thereof as long as care is taken to ensure that an appropriate amount of oxidant sufficient for polymerizing the monomer is present in these solvents.

The concentration of monomer in these solvents is in general within the range from $10^{-5}$ to $10^{-1}$, preferably from $5 \times 10^{-4}$ to $10^{-2}$, and the concentration of oxidant is dimensioned accordingly in accordance with the above criteria.

We have found that a particularly suitable combination for the polymerization from the liquid phase comprises water/methanol mixtures as solvent and sodium peroxodisulfate as oxidant.

The above dealt with the preparation of the electroconductive polymer which forms the central constituent of the solid electrolyte by polymerization in the liquid phase. In principle, however, it is also possible to polymerize from the gas phase, ie. to apply monomer and oxidant to an appropriate carrier via the gas phase. It is possible to apply not only monomer but also oxidant by way of the gas phase; or to apply only the monomer or only the oxidant in this manner. If both the components are applied by way of the gas phase it is advantageous, in general, although not absolutely necessary, to do so nonsimultaneously.

EXAMPLE

A solution A is prepared from 5% by volume of pyrrole and 95% by volume of methanol.

To prepare solution B, 0.5 g of sodium peroxodisulfate ($Na_2S_2O_8$) was dissolved in 3 ml of water and 7 ml of methanol.

An aluminum platelet $4 \times 4$ mm in size having a welded-on contact strip was electrochemically oxidized in a conventional manner to be suitable for use as the anode foil of a 40 V capacitor. The metal platelet thus prepared was treated with a drop each of the two solutions A and B. After about 10 minutes the polymerization had ended, and the solvent was evaporated.

This coating process was carried out for a total of 3 times to produce a 30–40 $\mu$m thick polypyrrole layer having a conductivity of about 0.2 S/cm.

After a concluding dry at 20° C. under reduced pressure, the polypyrrole layer was provided with a graphite and conductive silver coating and a contact strip. The capacitor element obtained was subsequently sealed with an epoxy resin coating (the structure of this capacitor corresponds to that shown in the figure).

The solid-state capacitor had a capacity of 2.0 $\mu$F and a loss factor of 0.06 at 100 Hz and 20° C. The residual current after one minute at a voltage of 10 V was 1.3 $\mu$A. An electrolyte capacitor of similar geometry but based on a liquid electrolyte had a capacity of 2.0 $\mu$F, a loss factor of 0.107 and a residual current of 0.8 $\mu$A under identical conditions of measurement.

We claim:

1. A solid-state capacitor comprising a first metallic electrode, an oxide layer on the electrode as the dielectric layer and a counter electrode consisting of an intrinsically conductive polymer of a 5- or 6-membered aromatic heterocyclic compound, said polymer have been formed by oxidative polymerization of the monomers on the surface of the dielectric layer by means of an oxidant.

2. A solid-state capacitor as defined in claim 1, wherein the intrinsically conductive polymer is formed from pyrrole, thiophene, furan or aniline, or mixtures thereof.

3. A solid-state capacitor as defined in claim 1, wherein the counter electrode consisting of the intrinsically conductive polymer is formed from a layer of the monomers on the dielectric oxidic layer and one or more porous sheets soaked with the monomers, said soaked sheets having been placed on the dielectric layer, which is wetted with the monomers, whereupon polymerization has taken place.

4. A solid-state capacitor as defined in claim 3, where the porous sheet consists of carbonized paper.

5. A solid-state capacitor as claimed in claim 1, wherein the first electrode consists of aluminum and the dielectric layer consists of aluminum oxide generated on the aluminum electrode.

6. A solid-state capacitor as defined in claim 1 which is in the form of a wound capacitor.

7. A solid-state capacitor as defined in claim 1 which is encapsulated by an insulating plastic material.

8. A process for the production of a capacitor, which comprises wetting the oxide layer of a metal foil with a 5- or 6-membered aromatic heterocyclic compound and thereafter polymerizing the adherent monomer film by means of an oxidant.

* * * * *